United States Patent
Cai et al.

(10) Patent No.: US 8,718,075 B2
(45) Date of Patent: May 6, 2014

(54) METHOD AND APPARATUS FOR ADAPTING POLICY CONTROL

(75) Inventors: Xuejun Cai, Beijing (CN); Yuxi Shen, Beijing (CN); Xiuyong Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 51 days.

(21) Appl. No.: 13/388,158

(22) PCT Filed: Aug. 17, 2009

(86) PCT No.: PCT/CN2009/000936
§ 371 (c)(1),
(2), (4) Date: Feb. 22, 2012

(87) PCT Pub. No.: WO2011/020208
PCT Pub. Date: Feb. 24, 2011

(65) Prior Publication Data
US 2012/0176894 A1 Jul. 12, 2012

(51) Int. Cl.
*H04L 12/28* (2006.01)

(52) U.S. Cl.
USPC ............................................. 370/401

(58) Field of Classification Search
USPC ............ 370/351–356, 400–401; 379/114.03, 379/114.06–114.09, 130, 133, 134; 455/406–408
See application file for complete search history.

(56) References Cited

U.S. PATENT DOCUMENTS

| | | | | |
|---|---|---|---|---|
| 7,957,314 | B2 * | 6/2011 | Andreasen et al. | 370/252 |
| 8,331,229 | B1 * | 12/2012 | Hu et al. | 370/230 |
| 8,374,081 | B2 * | 2/2013 | Farrugia et al. | 370/229 |
| 2002/0046277 | A1 * | 4/2002 | Barna et al. | 709/224 |
| 2005/0122900 | A1 | 6/2005 | Tuulos et al. | |
| 2011/0106933 | A1 * | 5/2011 | Lovsen et al. | 709/223 |
| 2011/0158090 | A1 * | 6/2011 | Riley et al. | 370/230 |

FOREIGN PATENT DOCUMENTS

CN 1791269 A 6/2006

OTHER PUBLICATIONS

3rd Generation Partnership Project. "Technical Specification Group Services and System Aspects; Policy and Charging Control Architecture; (Release 9)." ETSI Standards, 3GPP TS 23.203 v.9.1.0, Jun. 30, 2009, pp. 33-56, Valbonne Sophia Antipolis, France.
Calhoun, P. et al., "Diameter Base Protocol", Network Working Group, Request for Comments: 3588, Category: Standards Track, Sep. 2003, pp. 1-131, The Internet Society.

(Continued)

*Primary Examiner* — Frank Duong
(74) *Attorney, Agent, or Firm* — Coats and Bennett PLLC

(57) ABSTRACT

Method and network nodes for adapting policy control function, wherein a load of a first network entity on which a policy execution function like a policy and charging enforcement function (PCEF) or a bearer binding and event reporting function (BBERF) is located is monitored (S4) and policy decisions are adapted based on said load. Particularly, the load may be reported to (N) or determined by a second network entity on which a policy supervision function like a policy and charging rules function (PCRF) is located, and said second network entity adapts policy decisions based on said load. When making policy decisions, the load status of a network entity like a gateway may thus be taken into account in addition to other factors.

12 Claims, 2 Drawing Sheets

(56) References Cited

OTHER PUBLICATIONS

Durham, D. et al., "The COPS (Common Open Policy Service) Protocol", Network Working Group, Request for Comments: 2748, Category: Standards Track, Jan. 2000, pp. 1-34, The Internet Society.

3rd Generation Partnership Project, "Technical Specification Group Services and System Aspects; Policy and charging control architecture (Release 8)", Dec. 2008, pp. 1-111, 3GPP TS 23.203 V8.4.0.

3rd Generation Partnership Project, "Technical Specification Group Core Network and Terminals; Policy and Charging Control over Rx reference point (Release 8)", Dec. 2008, pp. 1-39, 3GPP TS 29.214 V8.3.0.

3rd Generation Partnership Project, "Technical Specification Group Core Network and Terminals; Policy and Charging Control over Gx reference point (Release 7)", Dec. 2008, pp. 1-47, 3GPP TS 29.212 V7.7.0.

3rd Generation Partnership Project, "Technical Specification Group Services and System Aspects; General Packet Radio Service (GPRS) enhancements for Evolved Universal Terrestrial Radio Access Network (E-UTRAN) access (Release 8)", Dec. 2008, pp. 1-219, 3GPP TS 23.401 V8.4.1.

ETSI, "Telecommunications and Internet converged Services and Protocols for Advanced Networking (TISPAN); Resource and Admission Control Sub-system (RACS); Functional Architecture", Jun. 2006, pp. 1-41, ETSI ES 282 003 V1.1.1.

* cited by examiner

METHOD AND APPARATUS FOR ADAPTING POLICY CONTROL

TECHNICAL FIELD

The present invention relates to a method and network nodes for adapting policy control, particularly for adapting policies in a policy and charging rules function or/and a policy and charging enforcement function.

BACKGROUND

Policy and charging control comprises functions used in telecommunication systems to enable providers of telecommunication services to provide quality of service (QoS) functions and/or charging control, particularly in packet-switched respectively connectionless communication systems, for example IP-based service data flows. Policy decisions, e.g. decisions regarding acceptance of a particular service request and/or the provision of a certain bandwidth or bitrate for a service request, may be based on subscription information of a user requesting said service, bandwidth request of the requested service, and other information related to the network and services.

Such a policy control system is e.g. known from the Policy and Charging Control (PCC) architecture defined for the 3GPP evolved packet system (EPS) as documented in 3GPP Tech. Spec. 23.203, "Policy and Charging Control Architecture", Release 9, 2009.

The reference network architecture for PCC defined in the mentioned 3GPP specification is shown in FIG. 1. The PCC functionality is comprised by the functions of the Policy and Charging Enforcement Function (PCEF) 1, the Bearer Binding and Event Reporting Function (BBERF) 2, the Policy and Charging Rules Function (PCRF) 3, the Application Function (AF) 4, the Online Charging System (OCS) 5, the Offline Charging System (OFCS) 6 and the Subscription Profile Repository (SPR) 7.

The PCRF 3 is the policy engine of PCC which combines the service data flow description received over the Rx reference point and the input received from the Gx and Gxx reference points with user-specific policies and data from the subscription profile repository (SPR) 7 to form session level policy decisions and provides those to the PCEF 1 and the BBERF 2. The PCEF 1 enforces policy decisions received from the PCRF 3 and also provides the PCRF 3 with user- and access-specific information over the Gx reference point. The charging related information received over the Gx interface is further used when it interacts with the OCS 5 and OFCS 6. The PCEF 1 is usually located in a Gateway (GW; e.g., the PDN-GW in EPS).

When a mobile IP protocol is used between an access Gateway (e.g., the S-GW) and the PDN GW, the PDN GW has no knowledge of the bearers. The BBERF 2 was introduced into the architecture to handle this situation. The PCRF 3 provides the authorized QoS to the BBERF 2 over the Gxx reference point. The BBERF 2 detects events and reports them over the Gxx interface. The BBERF 2 is also responsible for service data flow detection, resource reservation and QoS control. The location of BBERF 2 depends on the particular access network. For example, for the 3GPP networks, the BBERF 2 (if applicable) is located in the serving gateway (SGW), whereas for HRPD (High Rate Packet Data) access network, the BBERF 2 is located in the HSGW.

In the described PCC architecture and also in some other policy control architectures, the policy decision function and policy enforcement function are distributed and put into different network elements. For example, in PCC the PCRF 3 is in charge of the policy provisioning and decision, while the PCEF 1/BBERF 2 is responsible for the installation and enforcement of the policy decision from the PCRF 3. The PCRF 3 usually makes the policy decision based on the inputs received from AF 4, SPR 7 and possibly other network entities.

In PCC a policy (including GBR, guaranteed bitrate services) request is always granted by the PCRF if requirements given by subscriber status etc. are met.

In cases where there is not enough bandwidth resource for a request, the PCEF shall drop some existing service flows or bearers with lower Allocation Retention Priority (ARP) value than the incoming request. In an even worse case, when there are no low priority flows or bearers having Pre-emption-Vulnerability enabled anymore in the PCEF 1, even newly incoming important policy requests can not be admitted.

A particular drawback of the existing solution is that, when the PCEF or BBERF is in overload with regard to control plane (i.e., the signaling load is heavy), the signaling exchange with the PCRF could deteriorate the situation further. In PCC, the PCEF or BBERF shall inform the PCRF about the result of a PCC rule operation received from the PCRF. If the PCEF can not finish the PCC rule enforcement successfully, the PCRF may resend the policy decision to the PCEF with or without modification. The signaling exchange, partly caused by the overload situation itself, will make the overload worse, potentially even resulting in a breakdown of parts of the network.

Such overload or congestion situations may particularly occur during emergency situations, e.g. major accidents, natural disasters like floods, earthquakes, hurricanes etc., terrorist attacks, and virtually any conceivable situation in which national security and/or public safety are affected. In such cases, network load will be high, and it may even be that the communication infrastructure itself is affected, but it will be of vital interest that at least important communication requests will be served, like the ones of emergency forces or administrative or governmental units.

But even under usual circumstances, a gateway in the core network, e.g. the gateway on which the PCEF resides, may get into a congestion or overload status due to an unexpected traffic burst or with the rapid data traffic increase in a future EPS network in which the RAN (Radio Access Network) gets high speed transfer rate. In such a situation, in which a gateway is in a status of high load, many existing bearers or Service Data Flows (SDFs) will be dropped to admit potential higher priority policy requests. In some cases, some low priority PCC rules may be admitted when PCEF has the required resource temporally, but soon later may be preempted by higher priority rules when the load on the PCEF increases again. In such a case, low priority requests will be admitted and dropped soon. This may degrade the end-user's experience and satisfaction degree.

SUMMARY

It is thus the aim of the present invention is to provide a possibility to handle such overload or congestion situations.

According to the invention, there is provided a method for adapting policy control, comprising the steps of monitoring a load of a first network entity on which a policy execution function is located and adapting policy decisions based on said load. Said method may comprise the step of reporting the monitored load to a second network entity on which a policy supervision function is located, wherein said second network entity performs the step of adapting policy decisions based on said load.

There is further provided a method for adapting policy control, comprising the steps of receiving reports on or determining a load of a first network entity on which a policy execution function is located and adapting policy decisions based on said load, wherein said method is performed by a second network entity on which a policy supervision function is located.

Said first network entity may monitor its load by itself, and may adapt policy decisions based on said load, or/and may report the load to a second network entity on which a policy supervision function is located which adapts policy decisions based on said load. Alternatively, the second network entity may monitor the load of the first entity and adapt policy decisions based on said load. It is also conceivable that the first and second network entities reside in a common network node, or that a further entity is provided for load monitoring and reporting said load to the second network entity.

In any case, the policy execution function may comprise a policy enforcement function, particularly a policy and charging enforcement function, or a bearer binding function, particularly a bearer binding and event reporting function. The policy supervision function may comprise a policy rules function, particularly a policy and charging rules function.

By these methods, the load status of a network entity comprising a policy execution function, like a gateway in the core network, is taken into account when policy decisions are made, thus providing a dynamic element to the otherwise static policies. As a result, service quality can be improved, as it may be better made sure that important or critical requests can be served, and that requests of lower importance are rather not admitted beforehand than dropped after commencing of service. As end-users are usually more frustrated on dropped requests than rejected requests, the experienced quality is higher.

The load as defined herein may refer e.g. to the available bandwidth, CPU load, memory usage or other parameters of the network entity comprising a policy execution function.

There is further provided a network node comprising a policy execution function, comprising a load monitoring function and further comprising means for adapting policy decisions based on said load and/or means for reporting said load to a second network node on which a policy supervision function is located.

There is further provided a network node comprising a policy supervision function and comprising means for monitoring a load of a network entity on which a policy execution function is located or means for receiving reports on said load from said network entity on which a policy execution function is located, and further comprising means for adapting policy decisions based on said load.

Said policy supervision function may comprise a policy rules function, particularly a policy and charging rules function, and said policy execution function may comprise a policy enforcement function, particularly a policy and charging enforcement function, or a bearer binding function, particularly a bearer binding and event reporting function.

For both of the provided network nodes, the advantages described with reference to the above method apply. Accordingly, each of said nodes may be adapted to perform the above-described method.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
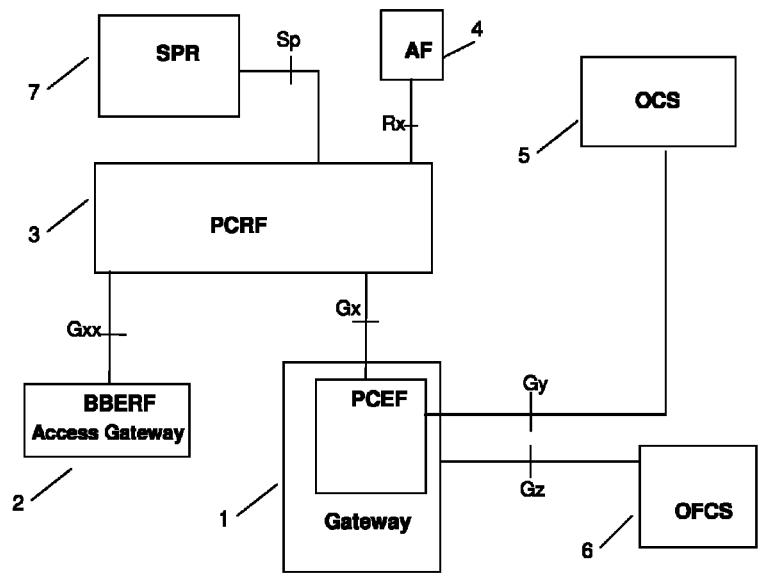
FIG. 1 is a block diagram showing the network architecture of a policy and charging control system.

FIG. 1 shows, as already explained above, the Policy and Charging Control (PCC) architecture defined for the 3GPP evolved packet system (EPS) as documented in 3GPP Tech. Spec. 23.203, "Policy and Charging Control Architecture", Release 9, 2009. The above-described method is applicable in this architecture, particularly for monitoring and accounting for the load of a core network node. For this purpose, the generally known architecture is amended by further functions and/or elements as described below.

When considering the architecture of FIG. 1, the network entity on which a policy execution function is located, respectively the network node comprising such function, corresponds to the gateway 1 comprising the PCEF (Policy and Charging Enforcement Function), and/or to the access gateway 2 comprising the BBERF (bearer binding and event reporting function). There may be both PCEF 1 and BBERF 2 provided in such a scenario, or only one of them. Further, the above-mentioned network entity on which a policy supervision function is located, respectively the network node comprising a policy supervision function, corresponds to the network node 3 comprising the PCRF (Policy and Charging Rules Function). Generally, a policy supervision function may provide for rules and decisions based on these rules and/or may distribute the rules among other network nodes. A policy execution function may then be used for implementing those rules and decisions, e.g. applying the rules for incoming requests.

Communication between the PCRF 3 and the PCEF 1 takes place over the Gx interface, and communication between the PCRF 3 and the BBERF 2 takes place over the Gxx interface, both interfaces being defined in the above-mentioned 3GPP Tech. Spec.

Note that usually the abbreviations of the functions located on a network entity like a network node, e.g. a gateway, may be used to denote the entity itself, e.g. PCEF 1 may be used to denote the gateway 1 on which the policy and charging enforcement function is located, BBERF 2 may be used denote the gateway 2 on which the bearer binding and event reporting function is located, and PCRF 3 may be used to denote the network node 3 on which the policy and charging rules function is located. Of course, these network nodes may comprise further elements or functions that are not in the focus here. Further, it is clear to a person skilled in the art that all mentioned network nodes comprise according hardware to perform or support their functionality, like one or more processors like microprocessors, e.g. general-purpose processors and/or (digital) signal processors, and/or dedicated hardwired circuitry, as well as software functions being executed thereon. Further, I/O circuits, buffers, memories etc. may be comprised. The reproduction of these elements has been omitted in the figures for sake of clarity.

Figure 2:
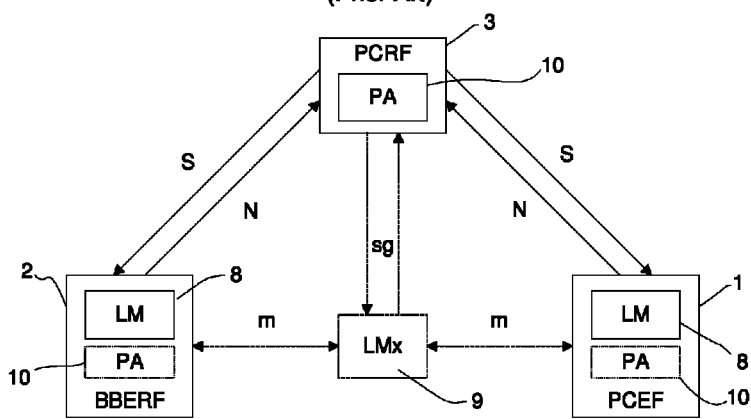
FIG. 2 is a block diagram showing a PCRF, a BBERF and a PCEF with interconnections.

FIG. 2 shows further details of the mentioned network entities and functions, namely of the PCRF 3, PCEF 1 and BBERF 2 that are of main interest here. In the following, the PCRF 3 may be exemplary and representative for a network node comprising a policy supervision function respectively a network entity on which such a function is located, and the PCEF 1 and BBERF 2 may be exemplary and representative for a network node comprising a policy execution function respectively a network entity on which such a function is located, without delimitating generality of the methods and procedures described herein The PCRF 3, which controls the policy and charging control function in this case, has communication connections to the PCEF 1 and/or BBERF 2, like the aforementioned Gx and/or Gxx interfaces. Initially, the PCRF 3 sends a subscription message S to the PCEF 1/BBERF 2, indicating that a load status is to be reported to the PCRF 3. In the message, the PCRF 3 may also tell which kind of load shall be reported by the PCEF 1/BBERF 2.

Such report is effected by the PCEF 1/BBERF 2 by means of a notification message N. This notification message N may be sent to the PCRF based on a request of the PCRF, like the subscription message S, or at certain, e.g. predetermined time intervals or based on predetermined events following said subscription message S. Events that trigger a notification message N may e.g. be changes in the load of the PCEF 1/BBERF 2 as described in greater detail further below, incoming requests for services, or particular requests from the PCRF 3.

In order to determine the load status to be reported, the PCEF 1/BBERF 2 comprises a load monitoring module (LM) 8, corresponding to the load monitoring means as mentioned above. This load monitoring module 8 may be embodied in different forms, e.g. depending on the type of load to be monitored. Load types may comprise e.g. available bandwidth, for example expressed as ratio of the used bandwidth (including reserved) over the total bandwidth capacity, CPU load, memory usage or other parameters. In some cases, load monitoring module 8 may comprise additional measurement circuitry in order to obtain load measurements, and/or a processing element for data preparation or pre-processing, and may also comprise software functionality being executed on said processing element.

It is also conceivable that, in alternative or in addition to the load monitoring module 8, an external load monitoring entity 9 (LMx, dashed box in FIG. 2) exists outside the PCEF 1/BBERF 2, i.e. apart from the network entity/entities whose load is to be monitored. Said external load monitoring entity 9 may have measurement or supervision connections m (dashed lines) to the PCEF 1/BBERF 2, e.g. for monitoring data traffic (payload and/or signaling) of the PCEF 1/BBERF 2. External load monitoring entity 9 may further have signaling connections sg (shown as dashed lines) with the PCRF 3, which may be bi-directional or unidirectional. Over these signaling connections sg, the PCRF 3 may instruct the external load monitoring entity 9 to commence or cease monitoring of a certain network entity, and monitoring notifications may be transmitted from the external load monitoring entity 9 to the PCRF 3. Such signaling may be similar to the communication with PCEF 1/BBERF 2 via subscription and notification messages S resp. N.

The external load monitoring entity (LMx) 9 may be an independent entity being provided in any arbitrary network node or in a separate, dedicated network node, or may be comprised in the PCRF 3 itself. Having one or more external load monitoring entities 9, it is possible to monitor a higher number of network nodes like different gateways with a low number of monitoring nodes, and it may also dynamically be decided which network nodes are to be supervised at a certain time, e.g. following a round robin principle. It is also conceivable that internal load monitoring means like the LM 8 of FIG. 2 in the network nodes to be supervised are combined with one or more external load monitoring entities, like LMx 9. In such a case, e.g. different types of load may be monitored by different load monitoring means/entities. For example, processing and/or memory load may be monitored by a load monitoring means LM in a network node like the PCEF 1/BBERF 2, and data traffic or signaling load may be monitored by an external load monitoring entity LMx, e.g. in the PCRF 3 or communicating with the PCRF 3.

After the load status has been reported to the PCRF 3, e.g. in a notification message N or via signaling sg, policy decisions may be adapted based on said load by a policy adaptation unit (PA) 10 being comprised in PCRF 3. Said policy adaptation unit 10 may e.g. be implemented as a software program being executed on a processor (not shown) of the PCRF 3, or e.g. as a set of additional rules being applied to the policy rules.

When making QoS (Quality of Service) related policy decisions, the PCRF 3 may take the current load status of the PCEF 1/BBERF 2 into account, together with other inputs, e.g. from AF 4 and SPR 7 (FIG. 1). The basic principle is that the higher the load of the PCEF 1/BBERF 2, the more important requests (authorizes QoS resources) or emergency service may be granted only. For example, the ARP (Allocation and Retention Priority) can be used to represent the importance of a request. The PCRF 3 can then notify the PCEF 1/BBERF 2 of a changed policy, or reject a policy/request directly without going through PCEF 1/BBERF 2, thus reducing signaling overhead particularly when the PCEF 1/BBERF 2 is in a state of congestion anyway.

It may alternatively or additionally be provided that the PCEF 1/BBERF 2 is enabled to adapt policy decisions by itself based on the monitored load, e.g. by means of a policy adaptation unit (PA, shown as dotted box) 10 comprised in the PCEF 1/BBERF 2. Said policy adaptation unit 10 of the PCEF 1/BBERF 2 may be similar to the policy adaptation unit 10 of the PCRF 3. When in the PULL mode according to 3GPP Tech. Spec. 29.212, "Policy and Charging Control over Gx Reference Point", 2008, i.e., a request is initiated by the UE (user equipment) alternative, it is not absolutely necessary for the PCEF 1/BBERF 2 to ask for the decision from the PCRF 3. Particularly when in overload status, the PCEF 1/BBERF 2 can, with PA 10, decide if the request shall be sent to the PCRF 3 or be rejected directly based on the monitored load.

Of course, in a case when there is only an external load monitoring entity (LMx) 9 and no internal load monitoring module (LM) 8 provided, a decision will have to be taken at the PCRF 3. It may, however, also be provided for a communication connection and function for reporting a load from an external load monitoring entity 9 to the PCEF 1/BBERF 2, thus again enabling the PCEF 1/BBERF 2 to take decisions on its own. As mentioned, for such a case a policy adaptation unit 10 will have to be provided at the PCEF 1/BBERF 2.

The load of a network gateway like a PCEF 1/BBERF 2 usually changes dynamically. By providing such dynamic status information of the PCEF 1/BBERF 2, the decisions made by the PCRF 3 and/or PCEF 1/BBERF 2 may be optimized. The load as defined herein may refer e.g. to the available bandwidth, CPU load, memory usage or other parameters of the Gateway at which the PCEF 1/BBERF 2 is located.

For the monitored load, different load levels may be defined based on the load, and policy decisions may be adapted based on a current load level. A change from one load level to another load level may e.g. effected when a predetermined threshold of the load is exceeded or under-run.

A load level may be defined to indicate the real-time load of a GW, like the PCEF 1/BBERF 2 of FIGS. 1 and 2. As mentioned before, the load may be the CPU load, memory usage, a bandwidth measure or other parameters. The traffic load may be taken as example, which may be represented by the ratio of the used bandwidth (including reserved) over the bandwidth capacity of the GW.

Figure 3:
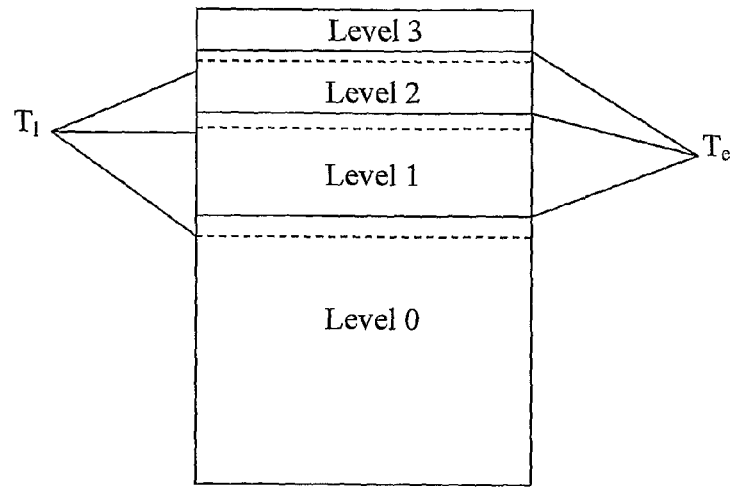
FIG. 3 is a block diagram showing different load levels.

In the example of FIG. 3, four load levels are defined: "Normal (0)", "Heavy (1)", "Congestion (2)" and "Critical (3)", and each load level (LL) is denoted by a numerical load index (LI). The load level and index may be pre-defined and may be defined such as to be understood by both a network node comprising a policy supervision function resp. a network entity on which such function is located and a network node comprising a policy execution function resp. a network entity on which such function is located; again, said network entities may be represented in an exemplary way by the PCRF 3 and the PCEF 1/BBERF 2, respectively, of FIGS. 1 and 2.

The actual load represented by the levels may be defined by the PCEF 1/BBERF 2. Alternatively it may also be defined in the PCRF 3 and then be sent to the PCEF 1/BBERF 2. In both cases, the load represented by the levels may be defined a priori or adapted dynamically. Of course, there are also other alternatives of defining load levels; particularly, the number and denomination of load levels may be different from the example described herein. Further, processing of the load levels may take place in the PCEF 1/BBERF 2 or already in the load monitoring module (LM) 8 resp. in the external load monitoring entity (LMx) 9 of FIG. 2.

Adaptation of policies as described above may then be accomplished based on the current load level of a gateway, like a PCEF 1/BBERF 2 of FIGS. 1 and 2, thus only requiring a limited number of rules for policy adaptation and avoiding having to adapt the policies too often, as the number of load levels is limited.

For each level except "normal" level, two thresholds are defined in FIG. 3: $T_e$ and $T_l$. When the load exceeds the $T_e$ threshold, it is determined that the supervised gateway, e.g. the PCEF 1/BBERF 2, enters the corresponding level represented by the threshold $T_e$ from a lower level. When the load falls below the $T_l$ threshold, it is determined that the Gateway leaves the higher level denoted by the threshold $T_l$ and enters the next lower level. To avoid load level oscillations, i.e., a frequent level change when a Gateway swings back and forth around a threshold, the two thresholds $T_e$ and $T_l$ may be set different and $T_l$ may be lower than $T_e$, thus providing a hysteresis. Decision on changes of the load level may be done by the load monitoring module (LM) 8 or external load monitoring entity (LMx) 9, by the PCEF 1/BBERF 2 or even by the PCRF 3.

As described above, the load could refer to the available bandwidth, CPU load, memory usage or other parameters of the Gateway at which the PCEF/BBERF is located. For example, traffic load represented by the ratio of the used bandwidth (including reserved) over the total bandwidth capacity of the Gateway is monitored and is denoted as T. Other parameters, e.g., CPU load can be used in a similar way. The Load Level (K) is defined in order to indicate the current load status of the gateway. For example, four Load Levels may be defined: "normal (0)", "heavy (1)", "congestion (2)", and "critical (3)", and may be denoted as "$K_0$", "$K_1$", "$K_2$" and "$K_3$" respectively. For each load level except "$K_0$", two thresholds are defined to avoid oscillation: the entry threshold $T_e$ and the leaving threshold $T_l$, wherein $T_e$ is preferably greater than $T_l$. When the load is increasing and gets greater than the $T_e$ of a certain level, then the gateway enters that load level from a lower level. When the load is decreasing and falls below the $T_l$ of a certain level, then the gateway leaves the current level and enters into a lower level.

For example, in the PCEF 1/BBERF 2, the load monitoring module 8 of FIG. 2 may be responsible for monitoring the real time load of the PCEF 1/BBERF 2. The load monitoring module LM periodically checks the load $\tau$ of the PCEF 1/BBERF 2 at an interval $\lambda$. Let t denote the current time. The current Load Level $K_t$ is decided by the LM based on the following equations:

$$K_t = K_n, \text{ if } \tau_t > T_e^n \text{ and } \tau_t < T_e^{n+1}$$

$$K_t = K_{n-1}, \text{ if } \tau_t < T_l^n \text{ and } T_t > T_l^{n-1}$$

In which $\tau_t$ represents the load at current time t; $T_e^n$ denotes the entry threshold of load level n, and $T_l^n$ denotes the leaving threshold of load level n. After determining the current load level $K_t$, the load monitoring module LM may check if the current load level $K_t$ is the same as the previous load level $K_{t-\lambda}$. If $K_t = K_{t-\lambda}$, i.e., the load level has not changed, then no action is taken; otherwise, if $K_t \neq K_{t-\lambda}$, i.e., the load level has changed, the load monitoring module 8 may trigger the PCEF 1/BBERF 2 to send a notification message N to the PCRF 3 to notify the change of the load level of the PCEF 1/BBERF 2.

In general, when the load monitoring means (LM) 8, external load monitoring entity (LMx) 9 or the PCEF 1/BBERF 2 decide or are notified of a change of a load level, said change may be reported to the PCRF 3, e.g. by a notification message N or via the signaling connection sg (FIG. 2). The PCRF 3 can then extract and record the load status resp. load level contained in the notification and adapt policies accordingly, e.g. by means of a policy adaptation unit 10. Of course, the PCEF 1/BBERF 2 itself may also take the detected load status/level into account as described above, e.g. by means of a policy adaptation unit 10. For example, when the PCEF 1/BBERF 2 is in "heavy" status, the PCRF 3 may only permit policy requests that have higher priorities (e.g., ARP<5). When the PCEF 1/BBERF 2 is in "congestion" status, only critical requests may be granted.

Figure 4:
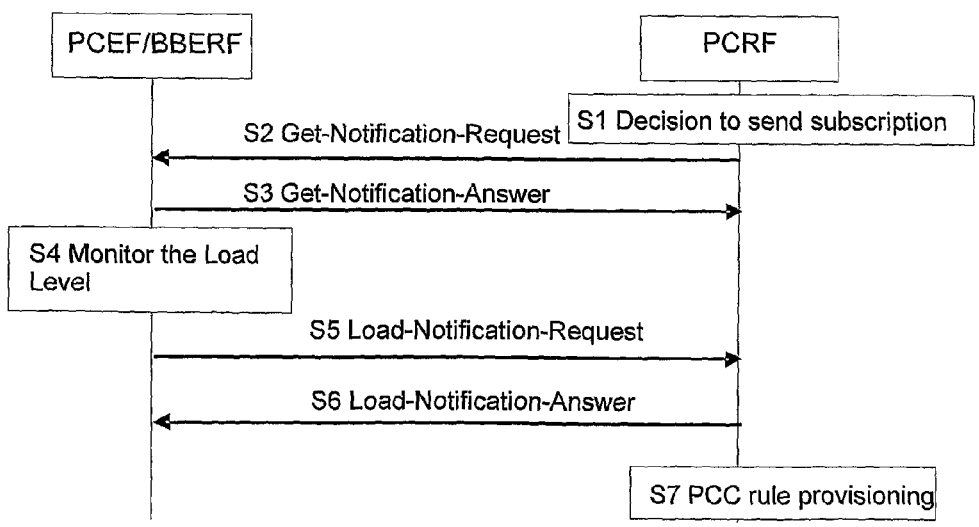
FIG. 4 is a signaling chart showing communication between a PCEF/BBERF and a PCRF.

FIG. 4 shows communication between a PCRF and a PCEF/BBERF regarding monitoring of a load of the PCEF/BBERF. Again, the PCRF 3 and PCEF 1/BBERF 2 of FIGS. 1 and 2 may be taken as examples for network nodes comprising a policy supervision function and a policy execution function, respectively, or network entities on which these functions are located.

After having taken a decision to let the PCEF/BBERF monitor its load in step S1, i.e. to subscribe the PCEF/BBERF to a load monitoring, the PCRF sends the subscription message Get-Notification-Request to the PCEF/BBERF in step S2. This Get-Notification-Request message may indicate to the PCEF/BBERF which type(s) of load is/are to be monitored ("load ID"), and may also comprise further control information, e.g. regarding the load levels to be determined. The PCEF/BBERF replies with a Get-Notification-Answer message in step S3, thus establishing the load monitoring and reporting function.

Subsequently, the PCEF/BBERF monitors its load in step S4, e.g. by determining a load level based on the load detected by the load monitoring means LM of FIG. 2, and sends a Load-Notification-Request message to the PCRF in step S5, thus reporting the current load resp. load level. Such Load-Notification-Request message may e.g. be provided at regular time intervals, or only when the monitored load or load level changes, or only once subsequent to the Get-Notification-Request message. In the latter case, the Get-Notification-Answer message of step S3 may be omitted as its function may be fulfilled by a Load-Notification-Request message of step S5. The PCEF replies to the Load-Notification-Request message with a Load-Notification-Answer message in step S6, acknowledging that the reported load or load level has been registered. Based on the load or load level, the PCRF then adapts the PCC rules and provides those for subsequent use in step S7, e.g. for processing requests in the PCRF itself and/or in the PCEF/BBERF.

To report the change of the load level of the PCEF/BBERF to the PCRF, the Gx and Gxx interface defined in 3GPP may be used. For this purpose, some new Command Codes and AVPs (attribute-value-pairs) may be defined. For example, for the messages mentioned above the following four Command Codes are defined: Get-Notification-Request, Get-Notification-Answer, Load-Notification-Request and Load-Notification Answer. The involved information elements (IE) are in more detail described in Tables 1-4 respectively, together with a mapping to the known Diameter protocol (for the Diameter protocol, see IETF RFC 3588, "Diameter Base Protocol", 2003).

TABLE 1

Get-Notification-Request

| Information element name | Mapping to Diameter AVP | Cat. | Description |
|---|---|---|---|
| Load List | Load-Type-ID | M | This IE may contain a list of load IDs that the PCRF wants to be notified of when the specified load changes in the PCEF/BBERF. |

TABLE 2

Get Notification Answer

| Information element name | Mapping to Diameter AVP | Cat. | Description |
|---|---|---|---|
| Result | Result-Code | M | This IE may contain the result of the operation. The Result-Code AVP may be used to indicate success/errors as defined in the Diameter Base Protocol. |

TABLE 3

Load Notification Request

| Information element name | Mapping to Diameter AVP | Cat. | Description |
|---|---|---|---|
| Load Level Notification | Load Level Notification | M | This IE may contain the load level notification from the PCEF/BBERF. It includes the load ID and the corresponding load level. |

TABLE 4

Load Notification Answer

| Information element name | Mapping to Diameter AVP | Cat. | Description |
|---|---|---|---|
| Result | Result-Code | M | This IE may contain the result of the operation. The Result-Code AVP may be used to indicate success/errors as defined in the Diameter Base Protocol. |

As can be seen from the above tables, three AVPs are defined: Load-Level AVP, Load-Type-ID AVP and Load-Level-Notification AVP. The Load-Level AVP is of type Enumerated, and it may indicate the current load level of the PCEF/BBERF. For example, the following values can be defined: NORMAL (0), HEAVY (1), CONGESTION (2) and CRITICAL (3). The Load-Type-ID AVP is of type Enumerated, and it identifies the load type, i.e., the CPU load, traffic load or others. For example, the following values can be defined: TRAFFIC_LOAD (0), CPU LOAD (1). The Load-Level-Notification AVP is of type Grouped, and may be used to report the load level changes of the PCEF/BBERF when the PCRF has requested to be informed of this load type. An exemplary AVP Format of the Load-Level-Notification message is:

Load-Level-Notification::= < AVP Header: xxxx >
[ Load-Type-ID]
[ Load-Level ]

Prior to the messaging as described above, a transport (e.g. Diameter) connection may be established and initialized between the PCRF and the PCEF/BBERF. As depicted in FIG. 4, the PCRF may send a Get-Notification-Request message to subscribe to the change of the load specified in it. When there is a change of the specified load status, then the PCEF/BBERF may send a Load-Notification-Request message to the PCRF, which contains the load ID and the corresponding Load Level.

Upon reception of the Load Notification Request, the PCRF may extract and record the value in the Load-Level-Notification AVP. As defined in 3GPP Tech. Spec. 29.212, "Policy and Charging Control over Gx Reference Point", 2008, when the PCRF provisions the PCC rules, there are two modes: Pull or Push mode. In Pull mode, the policy provisioning is solicited by the PCEF or BBERF. In Push mode, the PCRF may decide to provision the PCC policy without obtaining a request from the PCEF or BBERF. The provisioning may be triggered from the AF.

When provisioning rules, the PCRF may check the authorized QoS parameters (QCI) associated with the PCC rule. The basic principle is that the higher the load level, the higher priority or emergency requests may be allowed only. In PCC specifications, the priority level of Allocation and Retention Priority (ARP) defines the relative importance of a resource request. If the current load of the PCEF/BBERF is not in "Normal" level, the PCRF may only permit those higher-priority requests based on the current load level. For example, when the PCEF/BBERF is in "heavy" traffic load, then only those requests whose ARP priority is equal to or smaller than "10" may be permitted. Those requests whose ARP priority is greater than 10 may be rejected. When the PCEF is in "congestion" load level, then only those requests whose ARP priority is equal to or smaller than "5" may be permitted. When the PCEF is in "critical" load, only the most important requests whose ARP priority is "1" or emergency services may be permitted. For each load type of the PCEF/BBERF, the detail of the control strategy may be different. It will be an organisational measure to assign appropriate ARP values to respective requests.

One thing to be noted is that, when in PULL mode, if in overload status, the PCEF can decide if a low-priority request from the UE shall be dropped directly. So the signaling overhead between the PCEF/BBERF and the PCRF can be reduced. As already mentioned above, the PCEF/BBERF can only take decisions on its own when an (internal) load monitoring module or a communication connection and reporting function with an external load monitoring entity is provided.

As can be seen from the above examples, requests may be rejected, discarded or admitted based on the load of the first network entity (e.g., the PCEF/BBERF) and a priority measure (e.g. the ARP priority) assigned to said requests. Further, policies and/or priorities may be adapted depending on a load type of a request. This load type of a request may e.g. refer to the type of data to be communicated, e.g. VoIP, data traffic, etc., and may thus require a deep packet inspection.

As already mentioned, with the described methods and network nodes the drop probability of the arrival policy provisioning requests can be reduced. As end users are usually more sensitive on dropped existing request than rejected new requests, the user's experience can be improved. When the PCEF/BBERF is in overload and cannot admit new policy decisions, the PCRF can reject low priority policy requests directly and does not necessarily need to go through the PCEF/BBERF and can prevent the possible re-installation of the policy decision, so the control plane signaling overhead can be reduced. Altogether, the invention can guarantee that high priority or urgent requests can be admitted by preventing low priority requests, even when the PCEF/BBERF is in overload status. Load monitoring can easily be activated and/or deactivated, e.g. by enabling the mentioned load notification from the PCEF/BBERF with the defined Get Notification Request message.

It is understood that the above-described embodiments being based on the 3GPP PCC architecture are only one example of a field of application of the invention. However, there may be numerous other conceivable fields of application, virtually any communications network in which some sort of policy control and/or enforcement function is provided. Examples are other policy control systems in which the policy decision function and policy enforcement function are distributed, like systems described in IETF RFC 2748, "The COPS (Common Open Policy Service) Protocol", 2000, or in ETSI ES 282 003, "Resource and Admission Control Subsystem (RACS)—Functional architecture", 2009.

Further, several modifications will be apparent to and can be readily made by the skilled in the art without departing from the scope of the present invention. Particularly, not all network entities, connections and/or messages as described herein have necessarily to be provided, while also other entities, connections or messages may be defined in order to provide for the monitoring and/or reporting of a load of a network entity. Therefore, the scope of the claims shall not be limited by the illustrations or the embodiments given in the description in the form of examples, but rather the claims shall encompass all of the features of patentable novelty that reside in the present invention, including all the features that would be treated as equivalents by the skilled in the art.

The invention claimed is:

1. A method implemented in a first network node for adapting policy decisions in a wireless communication network, comprising:
monitoring a load of the first network node;
the first network node deciding whether to adapt a policy decision based on the load;
in response to deciding to adapt the policy decision, the first network node adapting the policy decision based on the load;
in response to deciding not to adapt the policy decision, the first network node reporting to a second network node for policy adaptation;
wherein a policy execution function is located on the first network node;
wherein a policy supervision function is located on the second network node.

2. The method of claim 1, further comprising reporting the monitored load to the second network node on which a policy supervision function is located, wherein the second network node performs policy adaptation based on the load.

3. The method of claim 1, wherein the policy execution function comprises a policy and charging enforcement function (PCEF), or a bearer binding and event reporting function (BBERF).

4. The method of claim 1, wherein the policy supervision function comprises a policy and charging rules function (PCRF).

5. The method of claim 1, wherein different load levels are defined based on the load, and wherein adapting policy decisions is performed based on a current load level.

6. The method of claim 5, wherein a change from one load level to another load level is effected when a predetermined load threshold is exceeded or under-run.

7. The method of claim 1, comprising:
rejecting, discarding, or admitting policy or service requests based on the load of the first network node; and
assigning a priority measure to the policy or service requests.

8. The method of claim 1, further comprising adapting policy decisions depending on a load type of the policy or service requests.

9. The method of claim 1, further comprising adapting priorities of policy or service requests depending on a load type of the policy or service requests.

10. A network node comprising:
a policy execution function circuit;
a load monitoring module configured to monitor a load of the network node; and
a policy adaptation unit configured to:
decide whether to adapt a policy decision based on the load;
in response to deciding to adapt the policy decision, adapt the policy decision based on the load;
in response to deciding not to adapt the policy decision, report the load to a remote policy supervision function network node for policy adaptation.

11. The network node of claim 10, wherein the policy execution function circuit is configured to implement a policy and charging enforcement function (PCEF) or a bearer binding and event reporting function (BBERF).

12. The network node of claim 10 wherein the policy adaptation unit configured to report the load to a remote policy supervision function network node comprises being configured to report the load to a network node that implements a policy and charging rules function (PCRF).

* * * * *